US008639487B1

(12) United States Patent
Ezer et al.

(10) Patent No.: US 8,639,487 B1
(45) Date of Patent: Jan. 28, 2014

(54) METHOD FOR MULTIPLE PROCESSOR SYSTEM-ON-A-CHIP HARDWARE AND SOFTWARE COGENERATION

(75) Inventors: Gulbin Ayse Ezer, Los Gatos, CA (US); Pavlos Konas, Mountain View, CA (US); John Barrett Andrews, Sunnyvale, CA (US); Stephen Wei Chou, San Jose, CA (US); Eileen Margaret Peters Long, San Jose, CA (US); Marc Alan Evans, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1960 days.

(21) Appl. No.: 10/400,157

(22) Filed: Mar. 25, 2003

(51) Int. Cl.
G06F 9/45 (2006.01)
G06F 17/50 (2006.01)

(52) U.S. Cl.
USPC ............... 703/14; 703/13; 716/102; 716/100

(58) Field of Classification Search
USPC ...................................................... 703/2, 14
See application file for complete search history.

(56) References Cited

U.S. PATENT DOCUMENTS

| | | | | | |
|---|---|---|---|---|---|
| 4,985,860 | A | * | 1/1991 | Vlach | 703/17 |
| 5,596,546 | A | * | 1/1997 | Wisecup | 367/47 |
| 6,006,022 | A | * | 12/1999 | Rhim et al. | 703/26 |
| 6,009,256 | A | * | 12/1999 | Tseng et al. | 703/13 |
| 6,110,217 | A | * | 8/2000 | Kazmierski et al. | 703/14 |
| 6,135,647 | A | * | 10/2000 | Balakrishnan et al. | 716/18 |
| 6,223,142 | B1 | * | 4/2001 | Bargh et al. | 703/13 |
| 6,389,379 | B1 | * | 5/2002 | Lin et al. | 703/14 |
| 6,477,691 | B1 | | 11/2002 | Bergamashi Rab et al. | 716/12 |
| 6,490,545 | B1 | * | 12/2002 | Peng | 703/13 |
| 6,513,146 | B1 | * | 1/2003 | Yonezawa et al. | 716/7 |
| 6,606,588 | B1 | * | 8/2003 | Schaumont et al. | 703/15 |
| 6,782,354 | B1 | * | 8/2004 | Ikegami | 703/2 |
| 7,925,477 | B2 | * | 4/2011 | Clune | 703/6 |
| 2002/0016952 | A1 | * | 2/2002 | Chang et al. | 716/18 |
| 2002/0038401 | A1 | | 3/2002 | Zaidi et al. | 710/305 |
| 2003/0005396 | A1 | * | 1/2003 | Chen et al. | 716/5 |
| 2003/0009730 | A1 | * | 1/2003 | Chen et al. | 716/5 |
| 2003/0014611 | A1 | * | 1/2003 | Ferris | 712/35 |
| 2003/0023950 | A1 | * | 1/2003 | Ma et al. | 717/102 |
| 2003/0093764 | A1 | * | 5/2003 | Devins et al. | 716/5 |
| 2004/0098569 | A1 | * | 5/2004 | Smith et al. | 712/229 |
| 2004/0123249 | A1 | * | 6/2004 | Sato et al. | 716/1 |
| 2004/0133861 | A1 | * | 7/2004 | Bollano et al. | 716/4 |
| 2005/0034090 | A1 | * | 2/2005 | Sato et al. | 703/13 |

(Continued)

OTHER PUBLICATIONS

C-Based SoC Design Flow and EDA Tools: An ASIC and System Vendor Perspective; Kazutoshi Wakabayashi et al; IEEE Transactions on Computer-Aided Design of Integrated Circuits and Systems, vol. 19, No. 12, Dec. 2000.*

(Continued)

Primary Examiner — Akash Saxena
(74) Attorney, Agent, or Firm — Sawyer Law Group, P.C.

(57) ABSTRACT

An automated system-on-chip (SOC) hardware and software cogeneration design flow allows an SOC designer, using a single source description for any platform-independent combination of reused or new IP blocks, to produce a configured hardware description language (HDL) description of the circuitry necessary to implement the SOC, while at the same time producing the development tools (e.g., compilers, assemblers, debuggers, simulator, software support libraries, reset sequences, etc.) used to generate the SOC software and the diagnostics environment used to verify the SOC.

27 Claims, 8 Drawing Sheets

(56) References Cited

U.S. PATENT DOCUMENTS

| | | | | |
|---|---|---|---|---|
| 2005/0102125 | A1* | 5/2005 | Tseng | 703/14 |
| 2005/0138580 | A1* | 6/2005 | Lim et al. | 716/3 |
| 2007/0239418 | A1* | 10/2007 | Harrison et al. | 703/13 |
| 2008/0294419 | A1* | 11/2008 | Backstrom et al. | 703/22 |
| 2010/0232299 | A1* | 9/2010 | Conway | 370/242 |
| 2012/0022847 | A1* | 1/2012 | Bailey et al. | 703/14 |

OTHER PUBLICATIONS

Hardware/Software Synthesis of Formal Specifications in Codesign of Embedded Systems; Vincenza Carchiolo et al; ACM Transactions on Design Automation of Electronic Systems, vol. 5, No. 3, Jul. 2000, pp. 399-432.*

C-based Synthesis Experiences with a Behavior Synthesizer, "Cyber"; Kazutoshi Wakabayashi; Dec. 9, 1998.*

Creating applications in RCADE; Hazelwood, K. et al; Aerospace Conference, 1999. Proceedings. 1999 IEEE vol. 2, Mar. 6-13, 1999 pp. 337-349 vol. 2.*

C++ Simulator "ClassMate" for Pre-verification on SOC; Hidefumi Kurokawa IEICE, 1998.*

Mixed Level Cosimulation for Fine Gradual Refinement of Cimmunction in SoC Design; G. Nicolescu et al; IEEE 2001.*

P. Flake and S. Davidmann, "Superlog, a unified design language for system-on-chip," in Proc. ASP-DAC 2000, 2000, pp. 583-586.*

Problem Solving in C Including Breadth & Laboratories; Angela B Shiflet; ISBN: 0-314-04554-6; 1995; p. 724.*

CyberWorkBench: Integrated Design Environment Based on C-based Behavior Synthesis and Verification Kazutoshi Wakabayashi, IEEE 2005, pp. 173-176.*

SpecC Modeling Guidelines; Andreas Gerstlauer Technical Report CECS-02-16 (revision of ICS-TR-00-48) Apr. 12, 2002.*

Space: A Hardware/Software SystemC Modeling Platform Including an RTOS; J. Chevalier; Electrical Engineering Department, 'Ecole Polytechnique de Montr'eal; 2003; pp. 1-12.*

Microsoft Computer Dictionary (p. 272)(Fifth Edition ISBN 0-7356-1495-4; Date 2002)—3 pages including covers.*

Goering, "Platform-based design: A choice, not a panacea," *EE Times: The Art of Change*, Sep. 2002, pp. 89-100.

* cited by examiner

METHOD FOR MULTIPLE PROCESSOR SYSTEM-ON-A-CHIP HARDWARE AND SOFTWARE COGENERATION

FIELD OF THE INVENTION

The present invention generally relates to the design of integrated circuits. More specifically, the present invention relates to a method for the automatic cogeneration of System-On-Chip (SOC) hardware and software from a single source description.

BACKGROUND OF THE INVENTION

The integrated circuit System-On-Chip (SOC) field has arisen as the amount of digital logic placed on a single semiconductor chip has substantially exceeded the amount of digital logic required by a single functional element. SOC technology uses the increased capacity of modern integrated circuits to create separate functional elements, or Intellectual Property (IP) blocks, on the same semiconductor chip. The separate IP blocks are connected and interconnected to satisfy the designer's system-level requirements. Each IP block can be quite complex and can do substantial amounts of work both with and without predetermined cycle by cycle interaction off the SOC. The IP blocks can also simultaneously run several different software programs, some of which may interact with other IP blocks on the SOC, as well as with devices off the SOC.

The IP blocks on a modern SOC can include multiple processing cores (e.g., microcontrollers, central processing units, etc.), multiple memories (e.g., volatile and non-volatile, cache, etc.), multiple peripherals (e.g., DMA engines, interrupt controllers, interface units, timing circuits, etc.), and the like. The modern SOC must also contain the necessary interconnects between the IP blocks within the SOC, as well as from the IP blocks to off-chip connections.

Typically, SOC IP blocks are reused from pre-designed and pre-verified IP blocks. However, an SOC designer still has to manually instantiate the reused IP blocks and manually create the interconnects between the IP blocks. This manual portion of the SOC design process is error-prone, time-inefficient, and costly.

This reuse of IP blocks has allowed for the creation of SOC platform-specific design environments. In these design environments, a portion of the SOC is pre-defined by the platform specification, thereby speeding up the SOC design process. However, such pre-defined platforms require use of a static bus structure, a particular memory, a basic real-time operation system, and a finite set of IP blocks that are specific to the platform. Each of these requirements limits the flexibility of the SOC designer to customize the SOC. Therefore, the SOC designer must sacrifice flexibility and customization for the decreased time-to-market offered by the platform-specific design environment.

Existing SOC platform design environments are either fixed for a special application with limited extensibility using predefined bus protocols or configurable from a fixed set of components that the user can mix and match. The abstraction of signal level connectivity is obtained by describing a system using predefined industry standard or proprietary interconnect/bus specifications, where components of the system can only be connected through these fixed number of interface types.

FIG. 1 illustrates a simplified example of the typical SOC design flow as is known in the art today. As shown in FIG. 1, architecture is sketched and a high level C-model is created for system simulations of functionality and performance using application snippets. If the system simulations of the architecture are unacceptable, then the C-model can be iteratively changed until the simulations are acceptable. These stages of the design are usually worked on by software engineers, perhaps with some consultation with hardware designers.

As also shown in FIG. 1, in parallel and independently, a hardware description language (HDL) model is written for the hardware, usually by hardware design engineers using a system architecture specification as their starting point. Thus, the software and hardware models are typically generated independently, and usually manually, by different engineering groups and disciplines. The HDL model is then converted to a gate level, or register transfer level (RTL), model and goes through the physical design process. If design goals are not met, architectural changes might be required. These changes are made to the HDL model and to the C-model, again, independently and manually, because there is no common source of representation of the system architecture and the changes cannot automatically be reflected from a single original source to all models. The feedback loop between the final physical design and the architecture is not a closed loop and any iterations made require many manual changes to different models and tools and is therefore extremely error-prone.

More recently, the SOC design flow allows for component reuse, with a limited ability under specific platform constraints, to write some new components. This newer generation design flow is equally as inefficient as the typical SOC design flow of FIG. 1 because, even though design of components can be reused, the system model must be manually rewritten to incorporate the components and to redesign the interconnects for each design iteration.

Therefore, what is needed is an automated SOC hardware and software cogeneration design flow that allows the SOC designer, using a single source description for any platform-independent combination of reused or new IP blocks, to produce a configured hardware description language (HDL) description of the circuitry necessary to implement the SOC, while at the same time producing the development tools (e.g., compilers, assemblers, debuggers, simulator, software support libraries, reset sequences, etc.) used to generate the SOC software, and the diagnostic environment used to verify the SOC.

SUMMARY OF THE INVENTION

The present invention is an automated, single source description, SOC hardware and software cogeneration design flow, hereafter referred to as the scalable system integration (SSI) flow or system. The SSI flow is a tool chain that uses a single source description for processors, system components and subsystems and provides a configured HDL description of circuitry necessary to implement the SOC. The SSI flow uses the same single source description for development tools, such as compilers, assemblers, debuggers, simulator, support libraries for software applications and reset sequences, which can be used to generate software for the multiple processor SOC, and a diagnostic environment to verify the SOC.

The SSI flow of the present invention does not require any specific interface protocol. Rather, it allows the user to first describe the interface and the components using attribute or property types specific to each, and then to build up any system architecture by connecting the components in the manner specified by the definition of their interfaces. In this way, the SSI flow of the present invention is extremely flexible at incorporating new components and new interconnects without major changes to the hardware or software automation tools.

The SSI flow of the present invention provides an automated multiple processor system generation methodology which uses a single description of the system, its components, connectivity and the configurability options and constraints in one common language format to develop a configured definition of the processors and other system logic circuitry, testbenches for the verification of such circuitry, and development tools such as compilers, assemblers, debuggers and simulators which can be used to generate software for the system. The SSI flow, therefore, is a significant innovation over the traditional approach at least because it unifies the source description of hardware and software components of the final system, and automatically generates them.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The attached Appendices form part of the present disclosure and are incorporated herein by reference in their entirety and for all purposes.

The design and development of a system involves a number of people with different objectives and requirements. Among those involved in the development of a system are: the system architect who experiments with abstract models, evaluates system performance, and decides the major components in the system; the application engineer who knows the application field, and who maps application onto a software program and a set of hardware blocks; the hardware engineer who implements the hardware components, creates the system, and evaluates its functional and timing behavior; and the system software engineer who ports the software part onto the created hardware, and who creates the necessary software environment.

The present invention provides an SOC design process for the automated cogeneration of hardware and software from a single source description, hereinafter referred to as the scalable system integration, or SSI, flow.

FIGS. 2A-2D illustrate an exemplary embodiment of the SSI flow of the present invention, and the description below expands on FIGS. 2A-2D by describing the various steps of the SSI flow, and by integrating those steps into a coherent design methodology. It will be understood that some steps presented in FIGS. 2A-2D can be combined with other of the steps presented, or may, for certain applications, be skipped altogether. These variations, the totality of which are not discussed herein, are intended to be encompassed by the present invention.

Figure 1:
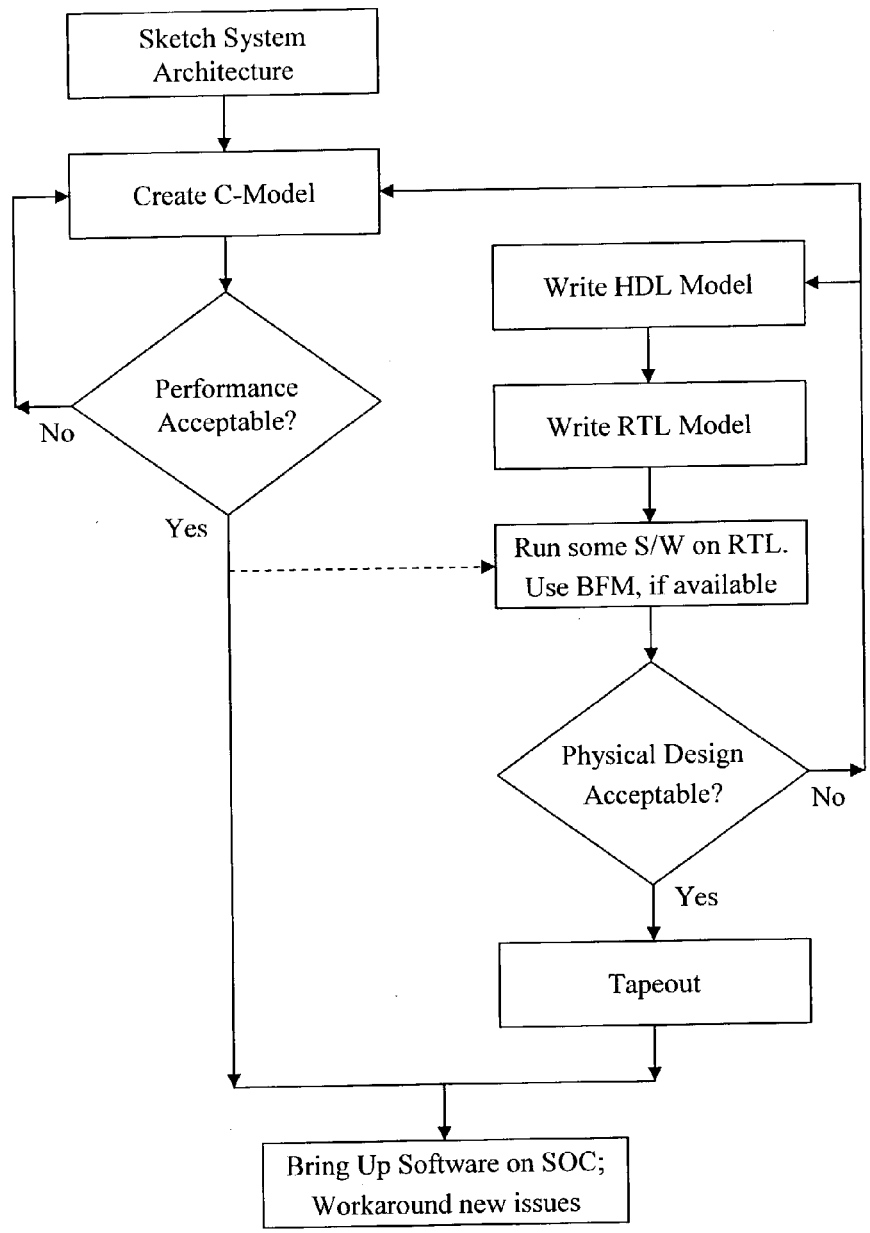
FIG. 1 illustrates a simplified example of the typical SOC design flow.
Figure 2A:
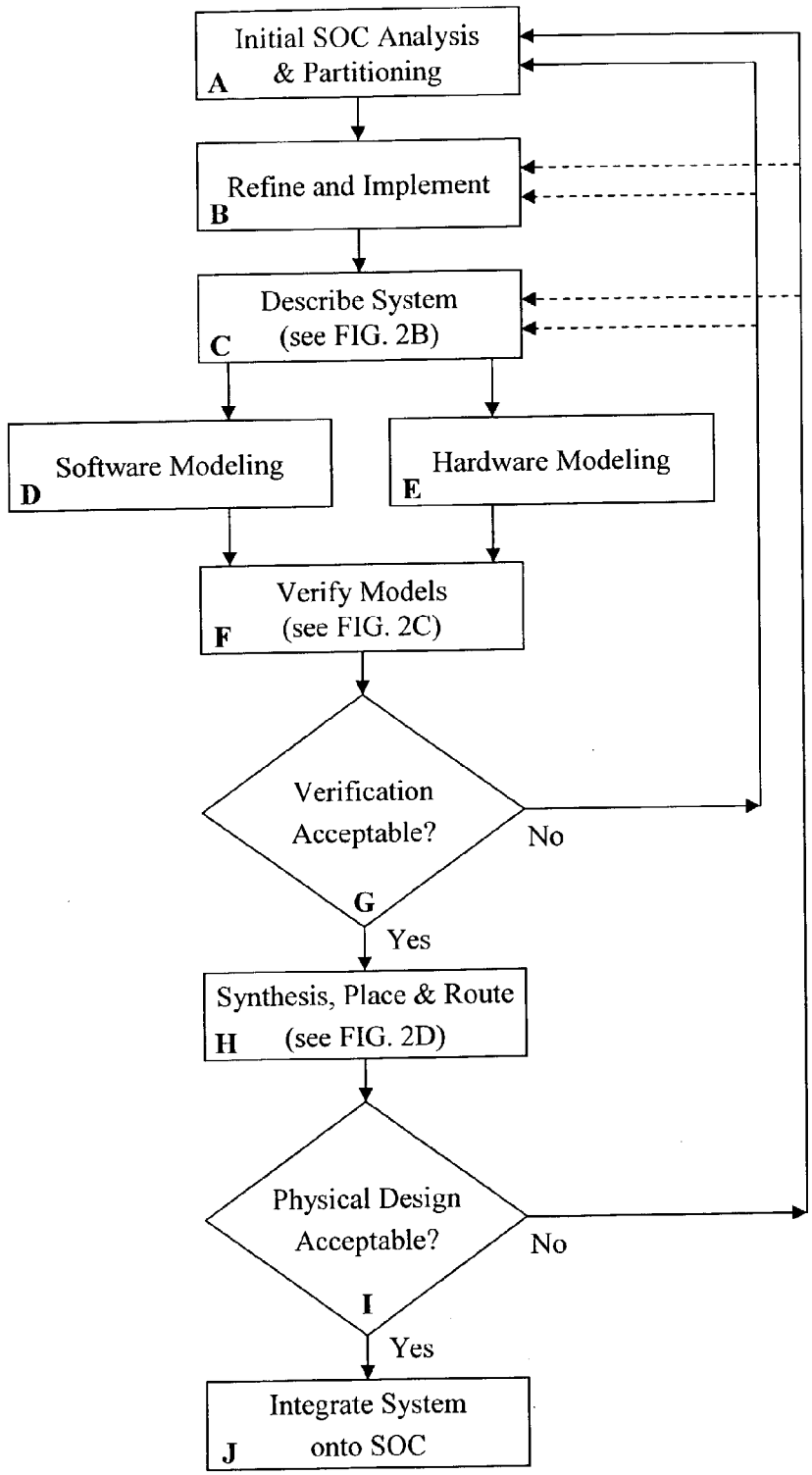
FIGS. 2A-2D illustrate a block diagram of an exemplary scalable system integration (SSI) flow of the present invention.

As shown in Step A of FIG. 2A, the user starts the SSI flow of the present invention by analyzing the application in order to determine the potential for employing multiple processor cores and in order to determine the type of parallelism to be exploited (e.g., symmetric multiprocessing, pipelined, loosely connected multi-core, etc.). In this embodiment, the user is not limited to any particular pre-verified or platform-specific IP blocks. The user also establishes performance metrics and determines performance levels that the SOC system should achieve. These metrics can include processing capability, power consumption, area occupied, response time, and the like.

Also in Step A of FIG. 2A, the user decides on an initial partitioning of the SOC application by identifying parts that can support concurrent execution, parts that exhibit different characteristics and, thus, may require different optimizations, and parts that provide well defined interfaces to the rest of the application. The user can partition the application by creating or extracting kernels that represent the various parts of the application which may be assigned to different cores. These kernels can then be used in designing and specifying each processor core that will execute a corresponding part of the application.

At Step B of FIG. 2A, the user begins utilizing an SOC generator and/or a processor generator to refine the architecture and to implement the final system/subsystem design. If the application is well partitioned between different cores, the user may opt for a bottom-up design methodology by configuring and developing the cores individually. This can be accomplished with, for example, Xtensa® cores, as described in the 'Xtensa® Processor Generator' documentation by Tensilica, Inc. If the user chooses a top-down design methodology or after he is finished building up the individual cores (e.g., the Xtensa® cores), an initial system that reflects the design decisions of Step A is ready to be created.

Beginning at Step C of FIG. 2A, the user will utilize the SOC generator to hook up and simulate the whole SOC system. In Step C, the user describes the system components, their configuration options and their connectivity. In one aspect, the user describes the SOC system by using the system configuration graphical user interface (GUI). In another aspect, the user describes the SOC system by writing the system description directly, in the appropriate textual syntax, using, for example, the system architecture and implementation (SARI) language. Regardless of which aspect is used, this step results in a syntactically accurate SARI language system description, where the system configuration GUI can output SARI language files.

The SARI language of the present invention is a system description language developed for the purpose of configuring SOC systems, describing the connectivity of their components and for specifying potential constraints on the system components. Furthermore, the SARI language of the present invention provides facilities for communicating information between the different SSI flow design implementation tools, which allows refinement of the design database as the system goes through the design flow iterations, as well as provides feedback that can be utilized by the tools earlier in the design flow. Step C is similar to describing a single core configuration except that the elements of the SOC system configuration can include multiple components, such as processor cores, memories, devices, and controllers, and these multiple components can have differing platform requirements.

In Step C of FIG. 2A, the user of this embodiment of the present invention describes the system in the SARI language in terms of multiple components and interfaces. The user describes the multiple components and interfaces of the SOC system as well as the overall SOC system structure using the SARI language (e.g., either graphically or textually). The user compiles the system description using the SSI flow for a specific target and checks for errors. System compilation, at this point, can entail the creation of several representations of the system. First, the user may create software models of the system based on functional and/or cycle-accurate software models of the various components. Second, the user may create hardware models of the system using the register transfer level (RTL) models of the various system components (for each component that has a hardware representation). Third, the user may create a bus functional model (BFM) of the system using the appropriate model of each system component. Fourth, the user may create a field-programmable gate array (FPGA) representation of the system using synthesizable RTL models of the various components. All of these system representations are automatically generated from the single SARI language description of the system by utilizing the appropriate models provided with each system component.

Figure 2B:
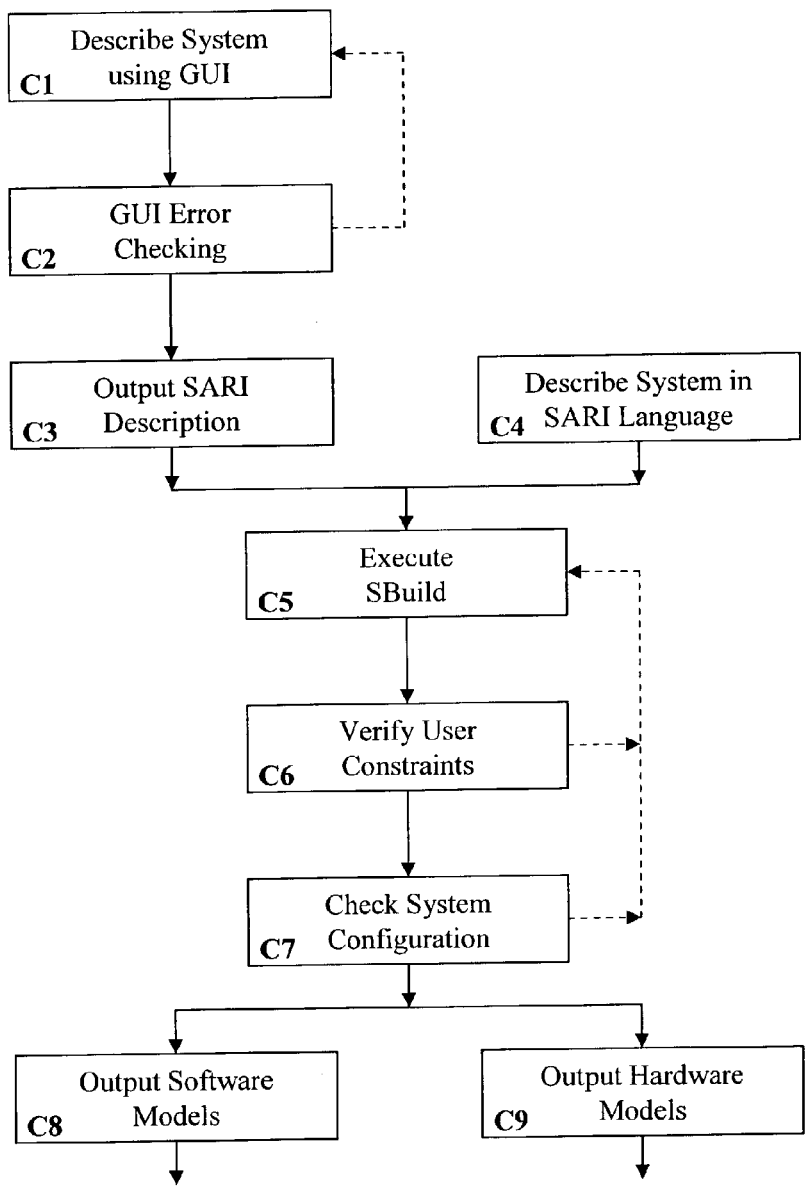

FIG. 2B further illustrates the system description of this embodiment of the present invention that was presented in Step C of FIG. 2A. In configuring a desired SOC system configuration, a user is confronted with many choices and configuration options at both the system and component levels. At the system level, the user must specify which components are to go in the system along with how they are to be interconnected. For example, an application may require two processors that share a common memory. In this example, the system-level description would need to specify both processors and the necessary interconnections from each processor to a memory controller. At the component level, each component must be configured such that it behaves properly within the desired system. For example, a memory mapped system component might have: an address map, an optional functions/features, and an interface, which in turn has configurable parameters like width, type, etc. While specifying these parameters, the user should be careful that they are compatible, i.e., component A connected to component B must have the same width parameter and support the same features on their respective interfaces.

As shown in FIG. 2B, and as previously discussed, the user can begin describing the SOC system by one of two methods: using the system configuration GUI (Steps C1-C3), or using the SARI language directly (Step C4). Each of these methods will now be described in more detail.

Step C1 of FIG. 2B illustrates an aspect of this embodiment of the present invention whereby the user describes the SOC system using the system configuration GUI. Depending on the type and the extent of the system to be configured, writing the SOC system by entering the SARI language file manually, or directly, can be an daunting task. To alleviate this error-prone task, the system configuration GUI provides an elegant means to create any target system through an intuitive, easy to use interface.

The system configuration GUI of the present invention operates, from a user interface standpoint, as any other GUI typically know in the art today. Therefore, the detailed operation of every aspect of the system configuration GUI is not described herein. However, for purposes of completeness, some aspects of the GUI of the present invention are described below.

Figure 3:
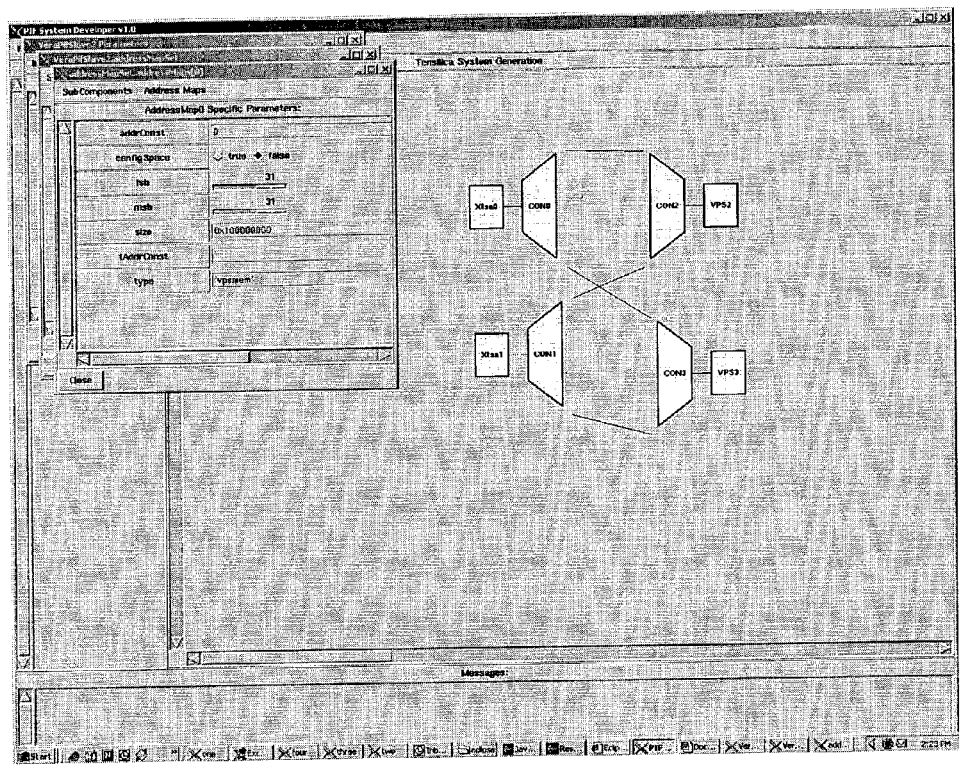
FIG. 3 illustrates a system configuration GUI screen-shot of the present invention.

In one aspect of the GUI of the present invention, the user picks components to go into the SOC system from the system configuration GUI component library. This is accomplished through a simple point and click interface to place the components. FIG. 3 illustrates a system configuration GUI screen-shot of the present invention. For component interfaces that are recognized by the GUI, certain parameters of these recognized interfaces may be inferred automatically. For example, if the system enforces that all processor widths are 32 bits, then all processor components' default interface widths will automatically be inferred as 32 bits. These automatically inferred parameters can be overridden by the user at any time. Further, in this aspect of the present invention, as the user drags and drops components, the system configuration GUI reads in SARI language component descriptions. It is important to emphasize that users can generate systems consisting of any arbitrary mix of predefined or user-defined components, so long as a component SARI language description is provided to the GUI system configuration.

Another feature of the system configuration GUI is that, along with inferring component parameters, it has the ability to infer certain interconnect components automatically. For example, if a user specifies an Xtensa® core to be connected to two other components via the processor interface, an interconnect will automatically be inferred and connected to the Xtensa® core and the two components. When components are inferred and connected up automatically, all of their component and interface parameters are inferred as well to match the SOC system requirements. These inferred inferences make configuring systems extremely simple and convenient.

A further feature of the system configuration GUI is that all system SARI descriptions generated from the GUI are guaranteed to follow legal constraint boundaries. Because, while the user can configure component and interface parameters or override inferred parameters, the system configuration GUI provides some basic parameter error checking. For example, if a component constraint states that parameter A cannot be true when parameter B is true, the GUI will flag an error if both parameter A and B are configured as true. Additionally, in the event that a particular parameter is an array index which determines the number of subcomponents or interfaces, the system configuration GUI will automatically instantiate these constructs based on the parameter. For example, if parameter A determines the number of interrupt interfaces a component possesses, the GUI will correctly display the number of interrupt interfaces based on this parameter. As shown in Step C2 of FIG. 2B, the system configuration GUI provides some system error checking. For example, the GUI will flag a warning if, among other things: certain interfaces are left unconnected, there is an address overlap within components in the subsystem, or illegal parameter values are used in a component.

The system configuration GUI of the present invention also allows the user to specify connectivity between components by selecting among a submenu of possible connection interfaces. When a user attempts to connect components together, only legal mating interfaces are selectable using the GUI submenu. The list of legal interface connections is determined by the connectdef blocks of the interface SARI file. Consider the following example:

```
connectdef PifMaster(a) PifSlave(b)
  begin signals
    a.POAdrs = b.PIAdrs;
    a.PODataBE = b.PIDataBE;
    a.POReqId = b.PIReqId;
    a.POReqRouteId = b.PIReqRouteId;
    a.PIReqRdy = b.POReqRdy;
    a.PORespRdy = b.PIRespRdy;
    a.PIRespId = b.PORespId;
    a.PIRespRouteId = b.PORespRouteId;
  end
;
```

In this example, PifSlave is a legal connecting interface to PifMaster. Therefore, when a user tries to connect up a PifMaster interface, only PifSlave interfaces will be displayed as possible connection choices. It is important to note that a particular interface can have any number of legal mating interfaces. To eliminate the need to configure both interfaces of the master and slave component, the slave components interface parameters are automatically inferred based upon the master to which it is connected. In the example above, if the PifMaster interface is 128 bits wide, the PifSlave interface will be inferred as 128 bits wide as well.

Another feature of the system configuration GUI is that it has the ability to infer certain interconnect components automatically (as contrasted to only inferring parameters of components). For example, if a user specifies an Xtensa® core to be connected to two other components via the processor interface, a PifConnect will automatically be inferred and connected to the Xtensa® core and the two other components. When components are inferred and connected up automatically, all of their component and interface parameters are inferred as well to match the system. These inferences make configuring systems using Xtensa® interfaces, for example, extremely simple and convenient.

Step C3 of FIG. 2B illustrates the final step of this aspect of the GUI of the present invention. As shown in Step C3, the user initiates output of a SARI language system description from the graphically described system of the GUI. The user has at least two choices for this SARI language output: the user can output a SARI language system description ready for build, or the user can save the SARI language system description hierarchy as a user-defined subsystem of the GUI component library, such that it can be instantiated in another SOC system.

Figure 4:
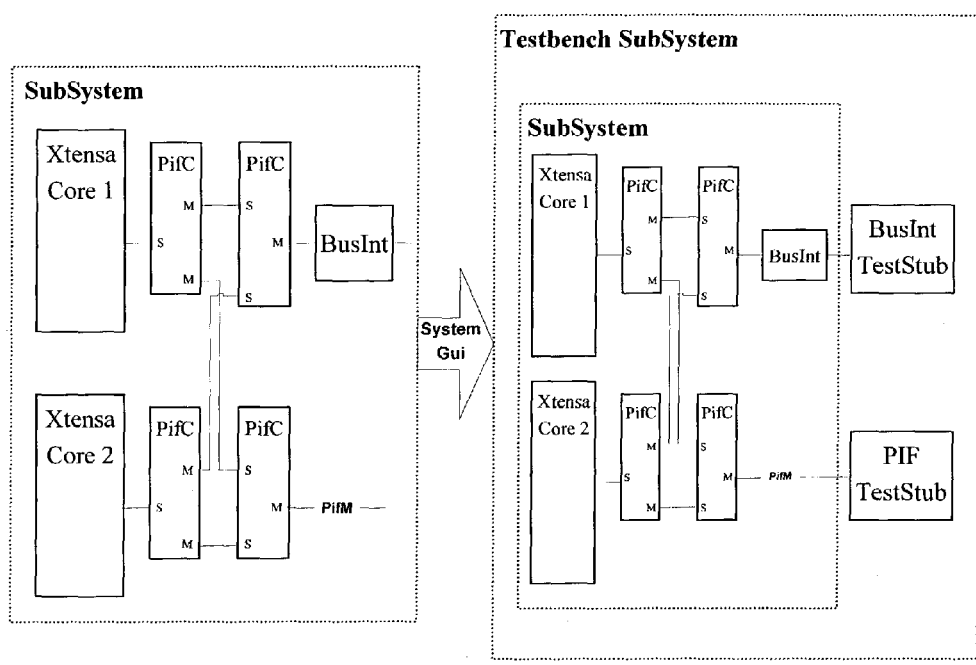
FIG. 4 illustrates an original user subsystem with dangling interfaces.

When the user chooses to output a SARI language system description ready for build, the GUI will output a file that the SSI flow build tool can read in automatically to generate the system. In creating this SARI file, the GUI will automatically recognize unconnected port types, or stubs, and instantiate appropriate test components for these stubs. The resulting SARI description contains these test components, or test stubs, connected to the SOC. During simulation or verification, these automatically instantiated test stubs can act as either masters, slaves or both. FIG. 4 illustrates an original subsystem described by the user with dangling interfaces, as would be the case if planning to integrate this subsystem into a larger SOC environment. FIG. 4 also shows a fully connected system with appropriate test stubs ready for verification as is provided from the output of the system configuration GUI of the present invention.

When the user chooses to save the SARI language system description hierarchy for instantiation in another system, the system configuration GUI effectively creates a level of hierarchy around the specified system such that the entire system can be instantiated as a single block. After this option is invoked, the new system block will appear on the list of components that can be instantiated for creating a new system.

Step C4 of FIG. 2B illustrates an aspect of the present invention whereby the user describes the SOC system directly using the SARI language. SARI is a textual, object-oriented language in which the user can describe the SOC system of hierarchical and possibly interconnected configurable components. A SARI language system description contains two parts. First, the user describes the various component types and interface types in the system. Then the user describes the SOC system by defining the components it contains, their parameters, and their connectivity. The SOC system can be as simple as a single component or it can contain collections of configurable components, each of which may represent hierarchies of composite components. The SARI language is based on the two powerful features: type hierarchy, and component synthesis. Each of these features is described in detail below.

The type hierarchy feature of this aspect of the present invention allows the user to describe the configuration of a component at various levels of abstraction without having to provide the same information in multiple places. In addition, type hierarchy allows the user to describe the common properties shared by a group of similar components in one place and only state the differentiating factors in the description of the various individual types.

Consider the following type hierarchy example:

```
component Memory
  begin parameters
    type : oneof {instRom,instRam,dataRom,dataRam};
    psize : u32 : 0;
    basePAddr : u32;
    accessWidth : oneof {32,64,128} : 32;
    ...
  end
  derived parameters
    addressWidth : u32 : (ceillog2((psize*8)/accessWidth));
  end
end;
component DataRom
  extends Memory(const type=dataRom)
  begin interfaces
    global : GlobalIntfc : undef;
    dataIntfc : RomIntfcIn : undef;
    loadIntfc : BitIntfcIn : undef;
  end
  begin components
    drom : SRam(addrWidth=addressWidth,ramWidth=
      accessWidth,size=psize);
  end
end;
```

In this example, component DataRom extends previously defined component Memory and inherits all of component Memory's parameters. Then, component DataRom adds extra parameters that characterize itself, and also adds a new subcomponent, drom. In essence, the DataRom component is a Memory component with extra characteristics. This SARI language feature allows creating common component types with common characteristics that can be inherited by increasingly more specialized component subtypes.

The component synthesis feature of this aspect of the present invention, on the other hand, allows the user to first describe the various individual parts of a complex component, and then to create the complex component by grouping the various individual parts. Furthermore, component synthesis allows the user to reuse the various individual parts, or even a previously created complex component, in the creation of new, increasingly more complex, components.

Consider the following component synthesis example:

```
component SingleProc
   begin parameters
      memoryOrder : oneof {LittleEndian,BigEndian} : LittleEndian;
      dataWidth : oneof {32,64,128} : 32;
   end
end;
component MultiProc
   begin components
      u1 : SingleProc(dataWidth=128);
      u2 : SingleProc(memoryOrder=BigEndian);
   end
end;
```

In this example, the component MultiProc is synthesized from two instantiations of the component SingleProc, where each instantiation is configured differently.

In this aspect of the present invention, there are at least two basic elements of the SARI language: the component, which represents a unit of configurability; and the interface, which is used in describing the connectivity between components.

A component is defined as a particular instance of a component type, where the more general component type describes the common characteristics of a set of similarly configurable components. In this embodiment of the present invention, a component definition has the following sections, some of which are optional:

component: component type name
extends: type hierarchy inheritance
begin parameters: configuration parameters
derived parameters: new configuration parameters derived from previously specified ones
begin constraints: configuration constraints
begin interfaces: top-level I/O of component
begin components: subcomponents
init interfaces: initialize interfaces of self or subcomponents' at lower levels of hierarchy
init components: initialize parameters of self or subcomponents' at lower levels of hierarchy
begin connections: hook up subcomponents through their interfaces
begin annotations: properties that can be added to components to share with different tools Likewise, an interface is defined as a particular instance of an interface type, where the more general interface type describes the common characteristics of a set of similarly configurable interfaces. In this embodiment of the present invention, an interface definition has the following sections, some of which are optional:

interface: interface type name
extends: type hierarchy inheritance
begin parameters: configuration parameters
derived parameters: new configuration parameters derived from previously specified ones
begin constraints: configuration constraints
begin signals: signal names and parameters for hardware support
begin interfaces: subinterfaces
init interfaces: initialize interfaces of self or subinterfaces at lower levels of hierarchy
begin annotations: properties that can be added to components to share with different tools In an embodiment of this aspect of the present invention, the SARI language supports component and interface configurability through the use of parameters. In this embodiment, there are at least three basic parts in the definition of a parameter. They are:

parameter name: can be any identifier, system configuration tools specific to the component use this name
parameter type: data type, i.e. string, u8, list, etc.
parameter default value: an optional default value In another embodiment of this aspect of the present invention, the SARI language supports information exchanged between different tools of the SSI flow through the use of annotations. In this embodiment, annotations either contain a key, which equals a value assignment, or they contain the specifications of a key. The SARI language does not interpret the annotations; it merely stores them verbatim in the internal interface type or component type representations. The SARI language leaves the interpretation of the annotations to the appropriate SSI flow tools.

Step C5 of FIG. 2B, represents the user executing the SSI flow build tool called SBuild. As shown in Step C5, once the user generates the SARI language system description file, either using the system configuration GUI or manually, the user executes SBuild, which builds the hardware and software development environments from the same SARI language system description file. Specifically, SBuild generates all of the hardware RTL necessary to implement the SOC design and all of the necessary software development tools, such as compilers, assemblers, debuggers, simulators, support libraries, and the like. In this embodiment of the present invention, SBuild contains four aspects, each of which are described below.

In the first aspect of this embodiment, SBuild calls the SARI language compiler to compile the SARI language system description file and create a unified database of the system configuration that includes all of the components, along with their attributes, and all of the component connectivity information. The centralized system configuration database is used to generate both the hardware models and software models.

In the second aspect of this embodiment, SBuild iterates through all of the system building blocks and creates a unit-level development environment for each unique configuration of a component type. Each unit-level development environment includes at least an RTL hardware model, a C simulation model and a testbench. The testbench facilitates a cycle accurate co-simulation of both the hardware model and the software model. Directed, or targeted, and random diagnostics to test each unit-level component are automatically generated and are run using the testbench to perform the simulations. The unit-level development environment helps iron out unit-level bugs and can test the components thoroughly before they are used in the system. Note that a separate design directory is built per unique configuration of a component and not per instance of the component. For example, if the system has two Xtensa® cores of configuration A and one Xtensa® core of configuration B, only two Xtensa® unit-level directories will be built: one corresponding to configuration A and one corresponding to configuration B.

In the third aspect of this embodiment, SBuild iterates through all of the user defined unique components and creates a hardware and software shell file for each component. Once ready to run a simulation, the user will replace these shell files with the unique RTL and C simulation model components.

In yet another aspect of this embodiment, SBuild creates the system-level development environment. The system level development environment consists of the system netlist, the hardware system testbench, a software system simulator and a suite of random and directed diagnostics. SBuild also builds all of the synthesis and place and route scripts necessary in taking the system to an ASIC or to an FPGA.

Steps C6 and C7, shown in FIG. 2B, are performed in connection with the SSI flow system configuration checker (discussed in further detail below). Most of the component and system configuration constraints can be specified in the SARI language system description file. As illustrated by Step C6, this feature allows the ability to check constraints on user-defined systems easily. Constraints are supported in the SARI language as follows: after specifying the parameters of a component or interface, the user can describe constraints on the values of these parameters. The compiler will evaluate these constraints in order to assert the validity of every instantiation of the component type or interface type. Constraints are defined using Boolean expressions on the parameters of the component or interface. In addition to Boolean expressions, the SARI language provides a collection of built-in functions to assist in the description of constraints.

To illustrate, consider the following simplified constraint example:

```
begin constraints
    (instructionWidth == (maxInstructionSize * 8));
end
```

According to this constraint example, in every instantiation of a component type that contains the constraint, the parameter instructionWidth must have a value that is equal to 8 times that of parameter maxInstructionSize. When the condition is violated, the compiler will issue an error message.

Once the user-defined systems are verified, the system configuration checker accesses the compiled system configuration database and checks it for the following additional constraints to ensure system correctness. The first check ensures that the configuration agrees with currently supported system build rules (i.e., same Endianness, data bus width, etc.). The next check ensures compatibility of system component configurations with each other (i.e., if component A is connected to component B through XLMI, the config parameters related to their interface should be identical in both). Also, the checker ensures compatibility of system address maps within the interconnected network. Finally, the checker detects hardware deadlocks (e.g., for a network using deterministic routing, checks if the network is cycle free).

If either Step C6 or Step C7 of FIG. 2B determines a system configuration error, then the user can correct the error in the SARI language system description file and re-run the SSI flow SBuild tool. In no constraint errors are found, the SBuild tool outputs the user-requested software models, Step C8, and hardware models, Step C9.

As shown in FIG. 2A, the user can now proceed with Steps D and E in parallel. In Step D, the user will perform the software modeling. This step utilizes the performance or functional model of the system. In Step E, the user will perform the hardware modeling. This step generates a fully connected hierarchical and synthesizable system netlist in HDL. As shown in Step F, following Steps D and E, the user can verify the software models or hardware models for acceptable performance and/or behavior. This step is discussed further in connection with FIG. 2C, below. If the user is not satisfied with the performance or behavior, the user returns to Step A, B or C, as appropriate, to make the required changes.

Step H of FIG. 2A, following Step G, is the system hardware physical flow of synthesis, place and route. This step is discussed further in connection with FIG. 2D, below. If changes are still required to the hardware or software, as shown in Step I of FIG. 2A, the user returns to Step A, B or C, as appropriate, to make the required changes. Finally, as shown in Step J of FIG. 2A, the system is ready for integration onto the SOC.

As previously discussed, in Step D of FIG. 2A, the user performs the software modeling. In connection with this Step, based on the SARI language system description file, the user compiles the application program, links its various pieces, and prepares the generated binary files for loading into the memories of the system, as well as onto the memories of the simulated system. The system compile for the software modeling target generates a C-based simulation model of the SOC system.

The system software model of the present invention is a program that provides functional, cycle-accurate, C-models of the various system components; each provided model may accurately represent the actual hardware or provide a more abstract representation of the hardware. The SOC subsystem software model, consisting of system component C-models, is provided in a library form with an SSI system application program interface, or API. This API allows the user to write a customized, multi-threaded simulator to model more complicated hardware systems. Because the simulator is written in C, it runs much faster than the one written as HDL. The C-model is also much easier to modify and update than a hardware prototype.

Thus, the API allows designers to create, debug, profile and verify their combined hardware and software system earlier in the design process.

Further, the system software model of the present invention is easily extensible to allow a user chooses to add a custom device software model. All that is required for this extensibility is: (a) a SARI description for the device that has a softwareModel parameter pointing to a custom C-model of the device; (b) a custom C-model of the device that compiles with the SSI system API, where this custom C-model is defined by callback functions that the simulator invokes whenever a processor issues a transaction directed to that device; and (c) instantiation of the device in the SSI system SARI file. The system software model generator tool in the SSI flow will access the system configuration database and create a 'main.c', which is the C-model for the full system.

Appendix A provides an example of a software model and the high-level SARI definition from which it was generated. Part 1 of this example provides the SARI description for a three-processor system with custom user device models for Xtensa local memories of instruction ram and data ram, indicated by softwareModel="modelfile", and Tensilica models for system ram, rom and an sdram controller. Part 2 of this example shows the automatically generated software C-model, where the included "modelfile.h" contains the function prototypes supplied by the user.

In Step E of FIG. 2A, the user creates the system hardware models by compiling the SARI language system description file for the desired hardware models. These SSI flow hardware models can include: RTL models of the various system components, HDL netlists of the various system components, an HDL netlist for the system, a BFM of the system, and an FPGA representation of the system. The BFM of the system can be used during verification experiments to speed up simulations, while the FPGA representation of the system can be used for verifying the system software using an FPGA board.

The HDL netlists, both unit-level and system-level, discussed in further detail below, contain placeholder modules for components whose HDL models are not available automatically as either standard components or user-defined components. The compiler can also generate a system-level and/or unit-level testbench, as well as a diagnostics suite for each testbench. The ability to create unit-level netlists and testbenches helps the user with incremental builds and simulation.

The system hardware model generator tool in the SSI flow of the present invention is essentially a netlist generator program which accesses the compiled SARI language system description configuration database, reads in netlist related properties of all the components, along with their interface definitions and connectivity information. The hardware generator creates at least two types of HDL models: (1) a fully-connected, hierarchical, synthesizable system netlist encapsulated in a top-level module, and (2) a verification testbench model with the necessary HDL wrapper modules for interfacing to design verification (DV) programs.

In one aspect of this embodiment of the present invention, the netlist generator is a generic program that makes no assumptions about a system platform, components, or the busses and interfaces that hook up these components. It works solely off of the SARI-based descriptions, which explicitly define component interfaces, their signals and how the interfaces connect. It traverses the hierarchical system description, finds all system modules, their sub-modules and interface connections and instantiates them inside HDL modules that it creates. This approach differs significantly from the currently available automatic platform generator or system builder tools, which require a user to design an interface or wrapper module for their custom components that conforms to a pre-defined API or protocol specified by the tool vendor.

Below is an example of an interface definition and component hookup descriptions in the SARI language:

```
//--------------------------------------------------------------------------
// PifCommon
//--------------------------------------------------------------------------
interface PifCommon
begin parameters
   master                : boolean : false;
   slave                 : boolean : false;
   piData                : oneof { 32, 64, 128 } : 32;
   poData                : oneof { 32, 64, 128 } : 32;
   id                    : u32 : 0;
   // autobench params
   testComp              : string : 'none';
   insertTestComp : oneof { ifNotPresent } : ifNotPresent;
   testCompLevel : oneof { top } : top;
end
begin signals
   PIData                : in : piData;
   PICntl                : in : 9;
   PIValid               : in : 1;
   POData                : out : poData;
   POCntl                : out : 9;
   POValid               : out : 1;
end
;
//--------------------------------------------------------------------------
// PifMaster
//--------------------------------------------------------------------------
interface PifMaster
   extends PifCommon (const master=true, const slave=false, const
      testComp='VeraPifSlave')
begin parameters
   poAddr                : oneof { 32 } : 32;
   byteEnable            : oneof { 4, 8, 16 } : 4;
   poReqId               : range { 0, 32 } : 0;
   poReqRouteId          : range { 0, 32 } : 0;
   piRespId              : range { 0, 32 } : 0;
   piRespRouteId         : range { 0, 32 } : 0;
end
begin signals
   POAdrs                : out : poAddr;
   PODataBE              : out : byteEnable;
   POReqId               : out : poReqId;
   POReqRouteId          : out : poReqRouteId;
   PORespRdy             : out : 1;
   PIReqRdy              : in : 1;
   PIRespId              : in : piRespId;
   PIRespRouteId         : in : piRespRouteId;
end
;
//--------------------------------------------------------------------------
// PifSlave
//--------------------------------------------------------------------------
interface PifSlave
   extends PifCommon (const master=false, const slave=true, const
      testComp='VeraPifMaster')
begin parameters
   piAddr                : range {0, 32} : 32;
   byteEnable            : oneof {4, 8, 16} : 4;
   piReqId               : range {0, 32} : 0;
   piReqRouteId          : range {0, 32} : 0;
   poRespId              : range {0, 32} : 0;
   poRespRouteId         : range {0, 32} : 0;
end
begin signals
   PIAdrs                : in : piAddr;
   PIDataBE              : in : byteEnable;
   PIReqId               : in : piReqId;
   PIReqRouteId          : in : piReqRouteId;
   PIRespRdy             : in : 1;
   POReqRdy              : out : 1;
   PORespId              : out : poRespId;
   PORespRouteId         : out : poRespRouteId;
end
;
//--------------------------------------------------------------------------
// Connectivity information
//--------------------------------------------------------------------------
connectdef PifCommon (a) PifCommon (b)
begin signals
   a.POData = b.PIData;
   a.POCntl = b.PICntl;
   a.POValid = b.PIValid;
   a.PIData = b.POData;
   a.PICntl = b.POCntl;
   a.PIValid = b.POValid;
end
;
connectdef PifMaster (a) PifSlave (b)
begin signals
   a.POAdrs = b.PIAdrs;
   a.PODataBE = b.PIDataBE;
   a.POReqId = b.PIReqId;
   a.POReqRouteId = b.PIReqRouteId;
   a.PIReqRdy = b.POReqRdy;
   a.PORespRdy = b.PIRespRdy;
   a.PIRespId = b.PORespId;
   a.PIRespRouteId = b.PORespRouteId;
end
;
connectdef PifMaster (a) PifMaster (b)
begin signals
   a.POAdrs = b.POAdrs;
   a.POData = b.POData;
   a.POCntl = b.POCntl;
   a.POValid = b.POValid;
```

-continued

```
        a.PODataBE = b.PODataBE;
        a.POReqId = b.POReqId;
        a.POReqRouteId = b.POReqRouteId;
        a.PORespRdy =b.PORespRdy;
        a.PIReqRdy = b.PIReqRdy;
        a.PIRespId = b.PIRespId;
        a.PIRespRouteId = b.PIRespRouteId;
        a.PIData = b.PIData;
        a.PICntl = b.PICntl;
        a.PIValid = b.PIValid;
    end
    connectdef PifSlave (a) PifSlave (b)
    begin signals
        a.POData = b.POData;
        a.POCntl = b.POCntl;
        a.PIValid = b.POValid;
        a.POReqRdy = b.POReqRdy;
        a.PORespId = b.PORespId;
        a.PORespRouteId = b.PORespRouteId;
        a.PIData = b.PIData;
        a.PICntl = b.PICntl;
        a.PIValid = b.PIValid;
        a.PIAdrs = b.PIAdrs;
        a.PIDataBE = b.PIDataBE;
        a.PIReqId= b.PIReqId;
        a.PIReqRouteId = b.PIReqRouteId;
        a.PIRespRdy = b.PIRespRdy;
    end
```

In this example, PifCommon is a subset of PifSlave and PifMaster interfaces and is included in both. This interface defines the Xtensa system interface which can be master or master/slave depending on the configuration options. All the low-level signals used in the HDL modules of Xtensa or other components are explicitly defined here. The sections that start with 'connectdef' define how these signals are connected when two interfaces are hooked up at the top level; for example when a PIF master interface is connected to a PIF slave interface, POValid of the master component will be connected to PIValid of the slave component, as given by the 'connectdef PifMaster(a) PifSlave(b)' description. However, when a PIF master interface is crossing a hierarchical boundary, which requires creation of a new HDL module, the POValid of the component is connected to the POValid of the top-level module, and this uses the 'connectdef PifMaster(a) PifMaster(b)' description.

The connectivity of the example above is defined in the top-level module SARI file as shown in the example below (this only shows master to slave type connectivity):

```
init interfaces
PifConnect0.siPifPort=PifSlave(byteEnable=16,poData=128,poRespId=0,piData=128,
    piReqId=0,piReqRouteId=0,poRespRouteId=0,poRegRouteId=0,piRespRouteId=0) ;
XtensaH263PM1.pifPort0=PifMaster(byteEnable=16,piData=128,piRespId=0,poData=12
    8,poReqId=0);
end
begin connectivity
XtensaH263PM0.pifPort0 = PifConnect0.siPifPort;
end
```

In this SARI file example, first the interfaces are instantiated and configured in the 'init interfaces' section, where the configurations mostly include databus width selections. Then they are connected in the 'begin connectivity' section.

In another aspect of this embodiment of the present invention, the netlist generator creates top-level signal names as a function of the original interface signal name, the instantiation hierarchy level, and the instance number of the interface. This facilitate the ability to hook up the HDL modules with unique net names at any level of the hierarchy. The netlist generator uses two special properties, 'netlistVisible' and 'netlistGenerateModule', that are used as keywords in the SARI files, to decide how to create and instantiate the module.

The 'netlistVisible' property indicates that the component is a leaf in the current hierarchy, i.e., the bottommost component, and should be instantiated inside the current hierarchy. Absence of the 'netlistVisible' property indicates that the component is a hierarchical module that should be flattened. The 'netlistGenerateModule' property tells the netlist generator to create a new module description for this component; this preserves the hierarchy in the netlist. The module description for the component will include its subcomponent instantiations.

In this embodiment of the present invention, the module name 'XtensaSubSystem' is used for the top-level hierarchy of the synthesizable HDL netlist. However it can be specified to be any name the user chooses to aid in creating and integrating multiple subsystems. The input and output (I/O) of the XtensaSubSystem module through which it can hook up to the user's SOC is any port or interface that is not connected internally between system components and is specified in the SARI system description database to be system I/O or tied off to a constant value. By default, dangling interfaces are brought up to the top-level and made to be XtensaSubSystem module I/O.

XtensaSubSystem leaf components may be a mixture of standard library components, custom-designed user components, and test stub modules. The test stub modules have a dual purpose, they can act as place holders for components that the user will later supply, they can also provide stimulus and modeling during verification simulations. The RTL models for these test stub modules will disallow synthesis. The testbench description, below, further explains the instantiation mechanism for these test stub modules.

Users can define the connectivity of the interfaces of the test stub modules in one of two ways. First, the user can explicitly instantiate interfaces and components (e.g., user black-boxes, or test stub modules) and connect them in the SARI language. The exact hierarchy of all components and interfaces can be explicitly specified. Any interface the user explicitly instantiates and wants to leave unconnected should use the export routine in the SARI language to bring the interface to a particular hierarchy level, otherwise an error message is given. Second, the user can choose to not provide an explicit interface or black-box instantiation. In this case the interface is inferred from the system component type and a test stub is attached at a default level of hierarchy. Note that inference is not done by the netlist generator, but by a separate tool integrated into the SSI flow that outputs the SARI file with all explicit connections complete with the attached test stub modules.

With this mechanism, the contents of XtensaSubSystem module as well as any lower-level module of design hierarchy that is automatically netlisted does not need editing. Only leaf modules at any level of the hierarchy that are the virtual components representing a user's black-box designs are then easily replaced by the user.

In Step F of FIG. 2A, the user can run a set of verification experiments (discussed in further detail below) measuring various aspects of the software design, and various aspects of the system-level and unit-level hardware designs, based on the previously established metrics of Step A of FIG. 2A. Such aspects can include the performance of individual cores, the performance of subsystems (e.g., utilization, sustained and maximum, bandwidth, delays through the system fabric, bottlenecks, etc.), the performance of the entire system (e.g., how well balanced its various subsystems are, etc.), as well as application-specific metrics that reflect the effectiveness of the hardware and software application-specific system. In another aspect of Step F of FIG. 2A, the user runs co-simulation experiments to help verify the software and hardware designs. Co-simulation is used to verify RTL and software models against each other.

Once the experiments are complete, the user analyzes the collected data from the experiments, and evaluates the data against the metrics established during step A of FIG. 2A. If the collected data are not sufficient for the evaluation of the various metrics, the user can run further verification experiments, gathering the necessary additional data. In this embodiment of the present invention, a set of SSI flow tools aids the user in the analysis of a large number of related metrics and in understanding the way in which the various components interact and effect each other.

Once sufficient data are collected for analyzed, the user determines the acceptability of the software and hardware designs and decides whether redesign is required, as shown in Step G of FIG. 2A. Should redesign be required, the user can return to Steps A, B, of C of FIG. 2A as required.

Figure 2C:
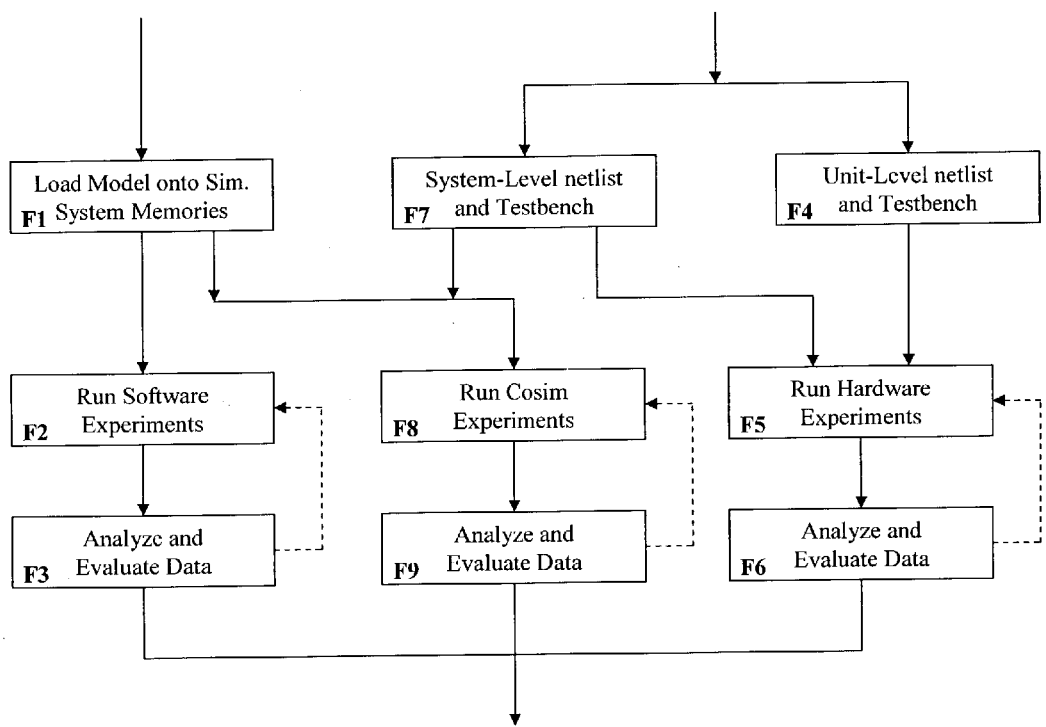

FIG. 2C further illustrates the SSI system verification flow of the present invention. As shown in FIG. 2C of this embodiment of the present invention, the SSI system verification flow allows verification of systems with arbitrary topology and arbitrary components. In an aspect of this embodiment, standard library components can be fully tested with self-checking random diagnostics. In another aspect, user-supplied components can be tested in a more limited manner by checking correct connectivity in the system.

In this embodiment, the SSI verification flow can be broken down into software experiments, hardware experiments and cosim experiments. Each of these experiments can be further broken down into unit-level testing and system-level testing. The software verification is performed using pure C-model simulations in the case of system-level testing, and C-model simulations within a testbench in the case of unit-level testing. The hardware verification is performed using testbenches. In the context of the present invention, a testbench is a system model in which the configured unit-level or system-level component or subsystem, which is called the device under test (DUT), is placed for testing. The testbench provides testing stimulus to the DUT by executing diagnostic programs.

Generally, the SSI system software verification flow of the present invention is summarized in the following steps of FIG. 2C. The SOC subsystem software model, consisting of system component C-models, is provided in a library form with an application program interface, or API (Step F1). This API allows the user to write a customized, multi-threaded simulator to model more complicated hardware systems. Because the simulator is written in C, it runs much faster than the one written as HDL. The C-model is also much easier to modify and update than a hardware prototype. The API allows designers to debug, profile and verify the software system (Step F2) and make additional experiments (Step F3) as necessary to thoroughly prove out the software design.

Generally, the SSI system hardware verification flow of the present invention is summarized in the following steps of FIG. 2C. First, a unit-level testbench is built (Step F4) for each uniquely configured system component from the single-source, system description database, and a system-level testbench is built (Step F7) for the full system or subsystem from the single-source, system description database. Configuration of the testbenches uses a similar approach as that described for the RTL and supports all options and extensions supported therein. Next, configured versions of self-checking directed-random diagnostic tests tailored to the unit and system are built (also Steps F4 and F7). A directed, or targeted, random diagnostic is one that primarily relies on random stimulus to test the design, but that uses varying probabilistic distributions to target various aspects of the design more efficiently and completely.

Thereafter, the self-checking directed-random diagnostics are run on the unit-level and system-level testbenches (Steps F5). The diagnostics themselves are configurable to tailor each for a particular piece of hardware. Monitors and checkers are also run along with the diagnostics to look for illegal states and conditions. Finally, the coverage of verification is determined by measuring functional and line coverage using SSI flow included tools (Steps F6).

Generally, the SSI system cosimulation flow of the present invention is summarized in the following steps of FIG. 2C. Cosimulation, or cosim, of RTL models and software C-models is achieved by monitoring the RTL signals at interfaces and comparing the values seen against the cycle-accurate C-models (Step F8). Unit-level testbenches are primarily self-checking and do not rely on cosim between RTL models and C-models to verify correct behavior. However, cosim is provided to run along with the self-checking diagnostics because cosim can verify that SOC component RTL and component C-models match each other, and cosim can check component functionality that is difficult to verify with self-checking diagnostics alone. As with software and hardware only verification experiments, the user can run additional cosim experiments as necessary to fully evaluate the SOC system (Step F9).

Turning now to the specifics of the hardware, software and cosim verification methodologies of the present invention. More specifically, regarding Step F4 of FIG. 2C, unit-level testing provides a testbench and diagnostics for testing each component of the SOC system by itself (i.e., in isolation). Note that unit-level testing is performed on standard library components (as well as at the system level); testing of user-defined components is performed at the system level.

In unit-level testing, the DUT is a uniquely configured system component with various external interfaces. These external interfaces are hooked up to test stubs (i.e., test components that are attached to dangling interfaces, and whose behavior can be easily controlled) that provide stimuli and check component output signals in response to those stimuli. For example, in the case of a processor core unit-level testbench, the test stubs attached will include memory models loaded with processor core instructions.

An aspect of the unit-level testbench of the present invention is to automatically infer and build the description of the interfaces for a given DUT. The correct verification test stubs for this interface are automatically inferred and instantiated in the unit-level testbench. In the case of this embodiment of the present invention, the unit-level testbenches can include the following examples of test stubs: clock generators; instigator slaves, masters, or both, to provide stimulus at, and compliant with, unconnected memory, device, and network interfaces; and interrupt generators for interrupt signals. For components with a configurable number of ports, the number of verification test stubs that must be inferred changes, as well as the test stub connectivity to the component. This is all automatically taken care of when the unit-level testbench is built. In addition, each test stub is configured to match the characteristics of the port to which it is attached. Unit-level diagnostics primarily use a directed-random strategy. The diagnostic programs are configured to match the specifics of the configured component. The verification test stubs of the present invention also support directly driving C-models. This is used to run diagnostics in a C-only software mode, where no RTL is present. This mode has several advantages over testing the C-models with cosim: it allows the C-model to achieve correct external behavior independently of matching the specifics of the RTL model; it achieves a faster simulation time; and it allows independent development of the C-model and the RTL model.

Regarding the details of Step F7 of FIG. 2C, system-level testing can supplement unit-level testing. In an embodiment of the present invention, system-level testing generally takes the following approach. First, system-level testing verifies system connectivity and protocol. This means verifying that all components are properly connected to their neighbors and that the protocols that each component obeys are compatible with their neighbors' protocols. Next, system-level testing verifies that a complete SOC system, as described in the system description database, works, where a working system is defined to at least meet the following goals: masters can access all slaves properly; masters can synchronize and communicate properly; and systems contain no performance anomalies (e.g., deadlocks, livelocks, starvation, etc.). Finally, system-level testing finds residual component bugs not found in unit-level test. Component bugs can be missed in the unit-level testing, yet found in the system-level testing, because of, for example, unintentional or incomplete stimulus in the unit-level testing.

Automatically generating system-level self-checking diagnostics for a system composed of multiple configurable components that can be connected in a virtually infinite number of ways is dauntingly complex. System-level verification complexity is made manageable by three attributes in the SSI flow of the present invention. The first attribute is that most connecting components are memory-mapped and are accessible by intelligent system components (also called 'masters') to provide data movement throughout the system. The second attribute is that no data transformation happens in the network between the data source and its destination. This latter attribute makes generating self-checking diagnostics easier. The third attribute is that system-level testing is backed by comprehensive unit-level testing; meaning that system-level testing is not the primary means used to find component-level bugs. Hence, system diagnostics focus on generating transactions on all interfaces and wiggling other system-level signals.

In this embodiment of the present invention, a system-level testbench can be automatically created for the described system using the single-source, system description database. The system-level testbench instantiates RTL for the SOC system and has inferred test stubs connected to each interface which escapes the SOC system. This system-level testbench consists of the system itself, inferred test stubs for each interface which exits SOC system, debugging aids, and protocol monitors.

In this embodiment of the present invention, there can be a specific test stub module for each interface and input/output (I/O) port of the SOC system, to control and drive the simulation stimuli. Furthermore, there may also exist test stubs embedded in lower levels of hierarchy of SOC system module, i.e. the memory model stubs for a processor's local memory interfaces. The system-level testbench generator tool infers these test stubs by examining the SOC system interfaces and attaching the customized test module for the interfaces.

In an aspect of this embodiment, the user is allowed to specify some of the test stubs (i.e., user black boxes) for some specific interfaces of user-defined system components. These user-specified test stubs may appear at any level in the netlist hierarchy. For example, the user may instantiate a DRAM test stub and attach it to processing core, and encapsulate this subsystem in one level of hierarchy required for floor-planning. This test stub also acts as a placeholder for the real DRAM component that the user will later insert into the final SOC environment. For simulation purposes, all the user needs to do is replace the DRAM definition file with the actual component model, the only requirement is that the actual component model should have the same I/O as the user-specified test stub being replaced.

If there are any unconnected interfaces in the lower levels of the SOC system hierarchy, the system testbench generator can infer and hook up the necessary test stubs. For example, the user may choose not to instantiate a DRAM and leave the processing core's local memory interfaces open.

To supplement cosim performed in unit-level testing, cosim is optionally performed in system-level test also. This has the goal of finding bugs or mismatches between RTL and C-models that are not caught in unit-level test. Cosim mismatches can be missed in the unit-level testing, yet found in the system-level testing, because of, for example, unintentional or incomplete stimulus in the unit-level testing.

More specifically, regarding Step F8 of FIG. 2C, the cosim experiment environment is created by traversing all of the interconnects in the system, instantiating special "monitor" modules to each interconnect interface, and attaching the appropriate C-models to these monitor modules. Each monitor module serves to convert the signal transitions on a particular interconnect into a C-style interface that describes the type of activity happening on the interconnect interface. By querying these interfaces during a diagnostic, the C-models receive all necessary information about what the RTL is doing. Then, a simple comparison is performed between the C outputs and the RTL outputs. Using these mechanisms, cosim support is automatically generated for all interfaces in the single-source, system description database.

The system diagnostic suite of the SSI flow of the present invention is a set of automatically generated system-level and unit-level self-checking, directed-random diagnostic programs. These diagnostics use a targeted-random methodology. A random methodology, as used in the context of the SSI flow, has at least the following characteristics: random diagnostics handle the diversity of SOC systems (i.e., the topology of the system is configurable, the system can have multiple transaction sources, the interaction of requests is difficult to statically predict, etc.); random diagnostics cover test cases not in a static test plan; and random diagnostics are more efficient at simultaneously covering multiple test cases, whereas directed diagnostics generally target one test case at a time. In addition, the diagnostic methodology of the SSI flow of the present invention is targeted-random because the size that is possible with SOC systems combines with their configurability to make it extremely difficult to achieve a high level of diagnostic coverage efficiently using static (non-targeted) random methodologies.

In the case of an SOC description where user-supplied components are present, system connectivity and functionality cannot be fully checked with the automatically generated directed-random self-checking diagnostics. Therefore, a directed test (i.e., not directed-random) that directly checks only system connectivity is included in the system test suite. To accomplish the connectivity testing, all modules in the system are substituted with special connectivity RTL that can drive (on outputs) or expect (on inputs) 0 or 1 on each interface bit at particular times. The modules are automatically configured to drive or expect the 0s and 1s in a way that will cause the test to pass only if all module wiring is correct in the entire system. This connectivity test can be accomplished in test time approximately proportional to log 2(N), where N is the total number of output signals summed over all modules in the system.

The following terminology is used throughout the detailed discussion, below, of the system diagnostics of the present invention: master, a system component attribute related to an interface through which the component initiates requests to a destination component for data movement; slave, a system component attribute related to an interface through which the component receives requests from a source component for data movement; knob, a part of the diagnostic mechanism that specifies the probabilities for the occurrence of various behaviors during simulation; driver, a part of the diagnostic mechanism that determines what operation to do next by executing a decision tree of choices, these choices are controlled by knobs; and instigator, a part of the diagnostic mechanism that consists of RTL or a test stub that runs part of the diagnostic by executing code contained in a driver. System components of the present invention can be classified as belonging to one or more or none of the three verification entities: instigator, master, or slave. Also, some components can be both a master and a slave on the same interface. System components include an actual component design (e.g., RTL) or a test stub in place of an actual component design.

In the SSI flow of the present invention, diagnostic testing is defined by all the knob files used in the simulation run. Object-oriented programming with inheritance is used to create variants of the base knob file used for each instigator. These variants, called derived knob files, use different probabilities to stress the system in different ways. The set of derived and base knob files for a given instigator are referred to as the knob set for that instigator. The knob sets are combined in various ways for each instigator instance in a particular configuration to create a diagnostic suite for that configuration. The use of combinations of these variants gives the diagnostic testing its targeted-random characteristic.

In an aspect of this embodiment of the present invention, instigators, which are also masters, are the main engines which control and drive a simulation. The knob, driver, instigator trio forms the basis of the SSI flow diagnostic mechanism and operates in the following manner: the driver receives inputs from the knob about address, operation type, memory region attributes, etc. and instructs the instigator about what operation to perform. The diagnostic actually consists of multiple independent drivers written for testbench support. Each instigator in the system is controlled by a driver and represents an independent point of control in the simulation. The behavior of drivers is controlled by knobs which specify the probabilities that various behaviors will occur during the simulation. As an example, consider a system where an Xtensa® core and an external interface are connected to a shared memory. During a diagnostic run, an Xtensa® core instigator may execute loads, stores, or synchronization instructions to a memory region, simultaneously with an interface master, which may perform load, store, or read transactions on the unconnected external interface to the same memory region.

To enable random simultaneous transactions between masters (i.e., sources) and slaves (i.e., destinations) in an SOC system, the diagnostic system needs to ensure that shared memories or devices are not corrupted when more than one master accesses them. For this reason, all of the addressable memories and devices in the system need to be allocated between the masters. This is accomplished by a system memory allocation tool of the SSI flow that accesses the system database generated by the SARI compiler, analyzes the network and address maps and allocates private and shared address regions for each instigator and master. These memory regions contain properties describing their size and access attributes, such as writable, destructive read, and the like. The allocation tool also makes address regions reserved for code and handlers (e.g., for reset, exception, interrupt, etc.) to ensure these areas are not corrupted by the diagnostics.

In another aspect of this embodiment of the present invention, the operations performed by instigators and masters are broken down into private operations and shared operations. Private operations are performed to memory regions accessed only from one master and meet most goals for the SSI system verification flow, except for goals related to synchronization and communication. The types of private operations include: Write Partial (transfer data width less than or equal to the interface width); Read Partial (transfer data width less than or equal to the interface width); Write Block (multiple transfer cycles on the interface); Read Block (multiple transfer cycles on the interface); and Read Conditional Write (compound read and write data transfer used to implement locks on destination memory).

Shared operations of this aspect test the goals related to synchronization and communication that are excepted from the private operations. The types of shared operations include: Producer Consumer (implements a shared queue between one writer master and one reader master using shared counters); Producer Consumer Interrupt (implements a shared location between one writer master and one reader master using an interrupt); Fetch And Increment (implements a shared counter between multiple masters using the Read Conditional Write primitive); Mutex RCW (implements a shared region between multiple masters using the Read Conditional Write primitive); and Mutex Bakery (implements a shared region between multiple masters using the software Bakery algorithm).

In another aspect of this embodiment of the present invention, non-memory-mapped interfaces are tested using other methods. For example, for some wire interfaces (e.g., those attached to a hardware queue between two Xtensa® cores), an algorithm like Producer Consumer is used, except that no special counters are needed. In another example, interrupt wires that exit the SOC system, the Interrupt Generator (IntGen) in the system testbench generates interrupts under control of the diagnostic running on that particular core instance, and a final interrupt count is used to check correct diagnostic execution.

Figure 2D:
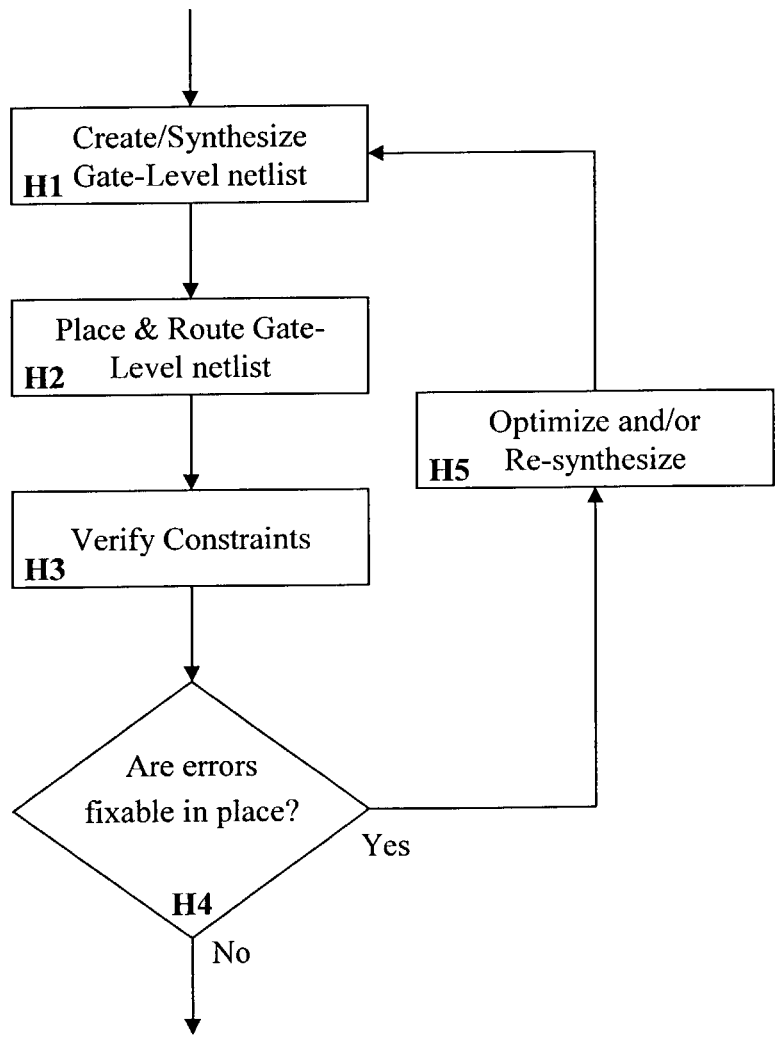

Once the hardware modeling and the software modeling result in acceptable designs that have been verified as discussed above, the user performs the hardware physical flow of synthesis, place and route. The translation of the physical netlist which passes all design-rule checks to a mask set is a fab-specific process. FIG. 2D details the steps of the hardware physical flow. As shown in step H1 of FIG. 2D, the user creates the system hardware gate-level netlist by synthesizing the HDL netlist into a particular vendor's library cells (e.g., ASIC cells) using industry standard synthesis CAD tools and are summarized below:

Initial synthesis run
    Floor plan and generate layout constraints
    Placement
    Clock tree synthesis
    Routing
    Parasitic extraction
    Timing verification
    IPO (in-Place Optimization) timing improvement
    Post-IPO (In-Place Optimization) timing improvement
    Post-IPO placement update
    Final parasitic extraction
    Final timing and area report generated
    Gate-level power analysis based on simulation activity annotation
    Gate-level power optimization based on simulation activity annotation To automate these processes, the SSI flow of the present invention can generate scripts for these tools based on user-defined constraints specified in the SARI language. The same language is also used to pass information, such as adding new constraints, between the tools. For example, consider the following physical design configuration library as described in a SARI language file:

```
//--------------------------------------------------------------------
// Design Implementation
//--------------------------------------------------------------------
component DesignImplementation
    begin parameters
        ImplTargetSpeed          : u32 :400;
        ImplTargetSize           : u32 : 20000;
        ImplTargetPower          : u32 : 75;
        ImplSpeedPriority        : oneof { Low, Medium,
                                    High } : High;
        ImplPowerPriority        : oneof { Low, Medium,
                                    High } : Medium;
        ImplSizePriority         : oneof { Low, Medium,
                                    High } : Low;
        ImplTargetTechnology     : oneof { 131v, 15m,
                                    18m, 25m, 35m,
            smns24wst, tsmc35wst, tsmc35typ} : 131v;
        ImplTargetLibraryType : oneof
            { TENSILICA_STD, USER_DEFINED } :
                TENSILICA_STD;
        ImplOperatingCondition : oneof { Worst, Typical } : Worst;
    end
;
component CadTools
    begin parameters
        CadHDL                   : oneof { Verilog,
                                    VHDL } :Verilog;
        CadParUseApollo          : boolean : true;
        CadParUseSiliconEnsemble : boolean : true;
        CadStvUseMotive          : boolean : false;
        CadStvUsePrimeTime       : boolean : false;
        CadStvUsePearl           : boolean : true;
        CadSynUseBuildGates      : boolean : false;
        CadSynUseDesignCompiler  : boolean : true;
        CadPsynUsePhysicalCompiler : boolean : false;
    end
;
```

Using these parameters, the user can describe a physical implementation of a specific size, speed and technology library by instantiating these environment components in the system description as follows:

```
//--------------------------------------------------------------------
// Instantiate physical design parameters in System description
//--------------------------------------------------------------------
component SystemX
    begin components
        p1              : ProcessorA;
        p2              : ProcessorB;
        i1              : Interconnect;
        implementation : DesignImplementation
            (ImplTargetSpeed = 300,
            ImplTargetSize = 30000,
            ImplSpeedPriority = Medium,
            ImplSizePriority = High,
            ImplTargetTechnology 18m);
        cadTools : CadTools
            (CadStvUseMotive = true,
            CadStvUsePearl = false,
            CadParUseApollo = true,
            CadPsynUsePhysicalCompiler = true);
    end
;
```

In another aspect, physical constraints can be specified for any level of system hierarchy and may have different values, i.e. use different wire load models, area/speed tradeoffs, etc. at different hierarchies. Customized script generation per level of hierarchy as defined in the SSI flow enables incremental design techniques and helps reduce design complexity significantly. The user can explore both bottom-up (first implement lower-level components using the associated scripts, then integrate them at top-level; best for large gate count designs) and top-down (using constraints of the top-level hierarchy to drive the full design; best for smaller gate count designs) physical design approaches. SOC physical design flow is usually very complex and there is no single method for obtaining the best final design. The automatically generated scripts provide an excellent starting point and act as templates for the designer to use, but further modification of the scripts or their regeneration may be required for optimal results.

As well as describing the initial design constraints and configurations for the physical system implementation, the SARI language is also used to pass critical result data between the tools. The annotation feature of the language can be used for this purpose. The result data annotated in SARI is the type that can be used as additional constraints for the next tool. In the example below, annotations are used to pass critical path information between synthesis and place and route scripts:

```
        begin annotations
            'critical_path_0' = 'proc.loadstore.cacheEn';
            'critical_path_1' = 'proc.loadstore.data[0]';
        end
```

Next, as shown in Step H2 of FIG. 2D, the user will place and route the gate-level netlist. After successful place and route, as shown in Step H3, the user will verify various architecture constraints, such as timing, power, and area. In Steps H4 and H5 of FIG. 2D, if there are errors in the architectural constraints and if the constraints are fixable with in-place optimization or re-synthesis, the user will perform in-place optimization or re-synthesis and return to Step H1. If there are no constraint errors or if the errors require HDL netlist changes or architectural changes, then the user will continue the process with Step I of FIG. 2A.

In another embodiment of the SSI flow of the present invention, the system builder also generates all the scripts, memory models and files necessary to take the system to a field programmable gate array (FPGA). This FPGA can be, for example, either an Altera® or Xilinx® FPGA. Support is built into the SSI flow to automatically and seamlessly take the SOC design to, for example, either of Tensilica's emulation boards, however the user is not limited to these platforms. A user may target any FPGA or board design provided that a pinout file for that board design is provided to the SSI flow. The FPGA flow supports industry standard FPGA compilation tools. During the build of the system, the system builder creates a script that is responsible for taking the SOC design to the user-selected FPGA.

Figure 5:
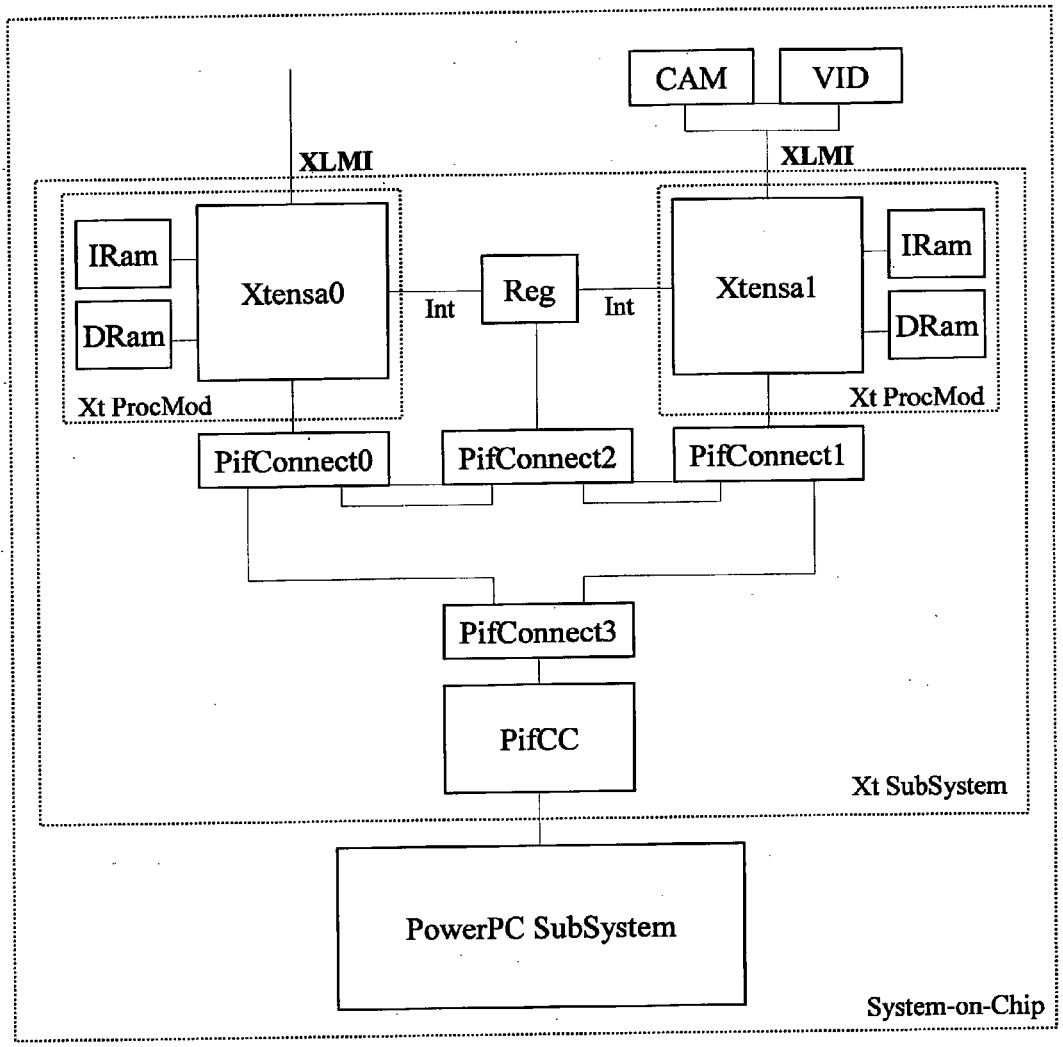
FIG. 5 illustrates a block diagram of an exemplary SOC designed using the SSI flow of the present invention.

FIG. 5 is a block diagram of an exemplary SOC designed using the SSI flow of the present invention. As shown in the example of FIG. 5, the SOC is a multiple processor system design that combines processor cores from different vendors, in this case an IBM PowerPC® core and two Tensilica Xtensa® cores. The system may be implemented as multiple chips or as one system-on-chip. The discussion of this example will concentrate on the Xtensa® subsystem which is customized to speed up the H.263 video codec application and is part of the overall larger system design that uses PowerPC® for other parallel applications. The SOC generation flow allows a full system analysis and design within the same SSI framework.

In the example shown in FIG. 5, the user describes the system architecture by creating a SARI file with descriptions of components that correspond to actual hardware modules. This new description is the source for the most accurate hardware and software model of the system. Mixed system models are also possible where some components have hardware design equivalents and some are only represented at an abstract level such as bus functional models. The input, System.sr, is a SARI file that accurately represents the XtensaH263 subsystem and also includes an abstract description of the PowerPC subsystem. The outputs can include: cycle accurate software C-models; software development tools; HDL hardware models; verification testbenches; diagnostic suite; and FPGA flow scripts.

Appendix B provides the SARI files of the FIG. 5 example, while Appendix C provides examples of top-level netlist Verilog® HDL output files. For clarification purposes, the list below provides exemplary Tensilica system building blocks used in Appendices A and B.

Xtensa® Processor: configurable and extensible processor

XlmiDevice: configurable RAM memory controller on Xtensa® local memory interface (XLMI) or Queues between two XLMI interfaces TIEQueue: configurable Queue on Xtensa® TIEWires interface PifSdramc: configurable SDRAM memory controller on PIF interconnect network PifSramc: configurable SRAM memory controller on PIF interconnect network PifReg: configurable dual ported register file, one port on PIF and one port a generic GPIO, with special synchronization primitive functions TAPController: configurable JTAG TAP controller PifMdma: configurable memory-to-memory DMA controller on PIF interconnect network BusInt: configurable bus bridge between PIF interconnect network and XT2000 (FPGA board) system bus PifCC: configurable bus bridge between PIF interconnect network and IBM CoreConnect Processor Local Bus PifConnect: configurable combinatorial crossbar element with a distributed arbitration scheme used to build PIF interconnect networks PifStage: configurable staging element which provides buffering between PIF interconnect networks PifWidthConverter: configurable staging element which provides buffering and width conversion between different width PIF interconnect networks Note that in the list above, Pif stands for Xtensa® Processor Interface, which is utilized to connect the cores to system busses or networks Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A method of generating models of a system-on-chip (SOC) using one and only one description language, the description language comprising a system architecture and implementation (SARI) language, the method comprising the steps of:

preparing a description of a plurality of hardware components to include in the SOC, the description being prepared using, and consisting of, the one and only one description language, the preparing step including, for each one of certain of the hardware components:

describing a type hierarchy of the component, including a configuration of the component at one or more levels of abstraction, and one or more common properties that are shared with a similar another one of the components, and describing a plurality of individual parts of the component and grouping them together so as to identify the component as a complex grouping of the individual parts, certain of the plurality of individual parts being shared with a different another one of the components, wherein the certain the hardware components in the description include at least one or more programmable processor cores; and compiling the description that was prepared using, and consisting of, the one and only one description language to automatically generate both one or more software models and one or more hardware models corresponding to the entire SOC, the compiling step including at least configuring the one or more processor cores according to the description.

2. The method of claim 1, wherein the step of compiling further includes compiling the description to automatically obtain at least one of a system diagnostics suite, a synthesis script, and a place and route script.

3. The method of claim 2, further comprising the step of: verifying at least one of the one or more software models and the one or more hardware models automatically using the system diagnostics suite.

4. The method of claim 3, wherein the step of verifying includes the steps of:

experimenting on the one or more software models to obtain data;

evaluating the data to obtain improvements to the description;

re-describing the SOC and the improvements using the one and only one description language to obtain an improved description; and re-compiling the improved description that was prepared and re-described using the one and only one description language to automatically obtain one or more improved software models, one or more improved hardware models, and an improved system diagnostics suite.

5. The method of claim 3, wherein the step of verifying includes the steps of:
   experimenting on the one or more hardware models using the system diagnostics suite to obtain data;
   evaluating the data to obtain improvements to the description;
   re-describing the SOC and the improvements using the one and only one description language to obtain an improved description; and
   re-compiling the improved description that was prepared and re-described using the one and only one description language to automatically obtain one or more improved software models, one or more improved hardware models, and an improved system diagnostics suite.

6. The method of claim 3, wherein the step of verifying includes the steps of:
   experimenting on the one or more software models to obtain first data;
   experimenting on the one or more hardware models using the system diagnostics suite to obtain second data;
   co-simulating the one or more software models with the one or more hardware models to obtain co-simulation data;
   evaluating the first data, the second data, and the co-simulation data to obtain improvements to the description;
   re-describing the SOC and the improvements using the one and only one description language to obtain an improved description; and
   re-compiling the improved description that was prepared and re-described using the one and only one description language to automatically obtain one or more improved software models, one or more improved hardware models, and an improved system diagnostics suite.

7. The method of claim 3, further comprising, after the step of verifying, the steps of:
   performing synthesis on the verified one or more hardware models to target at least one of an ASIC and an FPGA using the compiled synthesis script; and
   performing place and route on the verified one or more hardware models to target at least one of the ASIC and the FPGA using the compiled place and route script.

8. The method of claim 3, further comprising, after the step of verifying, the steps of:
   combining the verified one or more software models and the verified one or more hardware models to obtain a complete SOC design; and
   integrating the complete SOC design onto the SOC.

9. The method of claim 1, wherein the step of preparing includes using a graphical user interface that outputs the description in the one and only one description language.

10. The method of claim 1, wherein the one or more hardware models comprises at least one of:
    one or more unit-level models, each of the one or more unit-level models including a unit-level netlist and a unit-level testbench;
    a system-level model, the system-level model including a system-level netlist and a system-level testbench;
    a field-programmable gate array model; and
    a bus functional model.

11. The method of claim 1, wherein the description further includes a description of one or more interconnect components between the one or more core processors and the other logic in the SOC.

12. The method of claim 11, wherein the step of preparing includes using a graphical user interface that automatically infers the description of the one or more interconnect components based on descriptions of the one or more processor cores.

13. The method of claim 1, wherein the description includes a description of a hardware component and a design constraint for that hardware component, and wherein the compiling step includes automatically obtaining the hardware models in accordance with that design constraint.

14. The method of claim 13, wherein the design constraint includes one or more of a cell library, a target process technology, a target speed, and a target power.

15. The method of claim 1, wherein the hardware models automatically obtained from the compiled description include a fully connected RTL netlist for an entire SOC.

16. The method of claim 1, wherein the description further includes one or more connections between the components, and one or more parameters of the connections, the hardware components listed in the description further including other logic coupled to the one or more processor cores in the SOC, the other logic including at least one or more of a memory and a controller.

17. The method of claim 1, wherein the automatically generated hardware models include models corresponding to hardware implementations of the described processor core and other logic.

18. The method of claim 1, wherein the automatically generated software models model functionality corresponding to the described processor core and other logic.

19. A method of generating models of a system-on-chip (SOC), the method comprising the steps of:
    preparing one and only one single-source description of the entire SOC, the single-source system description listing hardware components to include in the SOC, one or more connections between the components, and one or more parameters of the components and the connections, the hardware components listed in the description including at least one or more programmable processor cores and other logic coupled to the one or more processor cores in the SOC, the other logic including at least one or more of a memory and a controller; and
    compiling the single-source system description to automatically generate both one or more software models and one or more hardware models corresponding to the entire SOC, the compiling step including at least configuring the one or more processor cores and certain of the other logic according to the parameters included in the description,
    wherein the automatically generated hardware models include models corresponding to hardware implementations of the described processor core and other logic, and
    wherein the automatically generated software models model functionality corresponding to the described processor core and other logic,
    the method further comprising, prior to the step of preparing, the steps of:
    defining a plurality of design constraints for the SOC; and
    partitioning the SOC according to the plurality of design constraints into a plurality of IP blocks and a plurality of interconnects, wherein the plurality of IP blocks and plurality of interconnects includes multi-architectural, application-independent, topologically-independent IP blocks and interconnects.

20. The method of claim 19, wherein the preparing step includes preparing a description of a plurality of hardware components to include in the SOC, the preparing step further including, for each one of certain of the hardware components:
- describing a type hierarchy of the component, including a configuration of the component at one or more levels of abstraction, and one or more common properties that are shared with a similar another one of the components, and
- describing a plurality of individual parts of the component and grouping them together so as to identify the component as a complex grouping of the individual parts, certain of the plurality of individual parts being shared with a different another one of the components.

21. A method for generating a system-on-chip (SOC) using one and only one description language, the description language comprising a system architecture and implementation (SARI) language, comprising:
- defining a plurality of hardware components, each definition including one or more parameters for selectively configuring the component, and one or more interfaces for communicating with the component, the hardware components including at least one programmable processor core;
- allowing a designer to select certain of the defined plurality of hardware components to include in the SOC;
- allowing the designer to provide values for the parameters for configuring certain of the selected components;
- listing the designer's selected components, their definitions, and the designer's provided configuration parameters in a single description corresponding to the SOC, the single description consisting of the one and only one description language;
- automatically generating, using the single description consisting of the one and only one description language, both:
  - a unit-level development environment for each of the listed components based on the definitions of the listed components and the provided configuration parameters in the single description, each unit-level development environment including at least a unit-level hardware model for allowing hardware implementation of the component, and
  - a unit-level software model for allowing software verification of the component separately from the rest of the components in the SOC, and a unit-level testbench for testing the component separately from the rest of the components in the SOC; and
- further automatically generating, using the single description consisting of the one and only one description language, a system-level development environment corresponding to the entire SOC based on the definitions of the listed components and the provided configuration parameters in the single description, the system-level development environment including at least a system netlist, a system testbench for testing the entire SOC, and place and route scripts for taking the entire SOC to an integrated circuit.

22. The method of claim 21, further comprising:
- automatically checking, before the generating steps, the designer's provided configurations to ensure the configured components are compatibly configured; and
- prompting the designer if they are not compatible.

23. The method of claim 21, wherein the steps of allowing the designer to select and configure the components includes using a graphical user interface that allows a user to point and click selected graphical objects corresponding to the selected components, and displays text corresponding to the selected components and any available configuration parameters.

24. The method of claim 23, further comprising:
- automatically inferring values of configuration parameters for a second selected component based on provided configuration parameters for a previous first selected component.

25. The method of claim 23, wherein the unit-level hardware model comprises a unit-level netlist.

26. The method of claim 21, further comprising:
- allowing the designer to specify design constraints including a target size, a target speed, and a target technology of the SOC,
- wherein the automatic generation of the system-level development environment includes automatically customizing the place and route scripts according to the specified design constraints.

27. The method of claim 21, wherein the defining step includes preparing a description of a plurality of hardware components to include in the SOC, including, for each one of certain of the hardware components:
- describing a type hierarchy of the component, including a configuration of the component at one or more levels of abstraction, and one or more common properties that are shared with a similar another one of the components, and
- describing a plurality of individual parts of the component and grouping them together so as to identify the component as a complex grouping of the individual parts, certain of the plurality of individual parts being shared with a different another one of the components.

* * * * *